US008995466B2

(12) United States Patent
Anigstein et al.

(10) Patent No.: US 8,995,466 B2
(45) Date of Patent: Mar. 31, 2015

(54) COMMUNICATIONS METHODS AND APPARATUS FOR USING A SINGLE LOGICAL LINK WITH MULTIPLE PHYSICAL LAYER CONNECTIONS

(75) Inventors: Pablo Anigstein, Springfield, NJ (US); Murari Srinivasan, Palo Alto, CA (US); Sathyadev Venkata Uppala, Whitehouse Station, NJ (US); Rakesh Champalal Dugad, Millburn, NJ (US); Arnab Das, Summit, NJ (US); Vladimir Parizhsky, New York, NY (US); Rajiv Laroia, Basking Ridge, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1174 days.

(21) Appl. No.: 11/316,601

(22) Filed: Dec. 22, 2005

(65) Prior Publication Data
US 2007/0147424 A1 Jun. 28, 2007

(51) Int. Cl.
*H04J 3/22* (2006.01)
*H04W 88/08* (2009.01)
*H04L 25/14* (2006.01)
*H04W 88/10* (2009.01)

(52) U.S. Cl.
CPC ............... *H04W 88/08* (2013.01); *H04L 25/14* (2013.01); *H04W 88/10* (2013.01)
USPC ........................................................ 370/469

(58) Field of Classification Search
USPC .................... 370/469, 474; 380/270; 714/748
See application file for complete search history.

(56) References Cited

U.S. PATENT DOCUMENTS

| 5,949,788 A | 9/1999 | Friedman et al. |
| 6,021,124 A | 2/2000 | Haartsen |
| 6,094,439 A * | 7/2000 | Krishna et al. ................ 370/445 |

(Continued)

FOREIGN PATENT DOCUMENTS

| EP | 1 473 881 | 11/2004 |
| WO | WO 01/30039 | 4/2001 |

(Continued)

OTHER PUBLICATIONS

Snoeren A C, "Adaptive Inverse Multiplexing for Wide-Area Wireless Networks" Global Telecommunications Conference, Globecom '99, vol. 3; pp. 1665-1672, Dated: Dec. 5, 1999.

(Continued)

*Primary Examiner* — Andrew Lai
*Assistant Examiner* — Leon Andrews
(74) *Attorney, Agent, or Firm* — Michelle S. Gallardo

(57) ABSTRACT

A base station uses a common link layer controller for multiple physical attachment points to facilitate concurrent wireless connections between different sector physical attachment points and a wireless terminal using the same link layer link. A wireless terminal maintains multiple simultaneous wireless connections for the same link layer link. A packet of user data is fragmented into a plurality of grouping of MAC frames, thus a packet portion can be communicated over a connection. A single packet is sometimes communicated with different portions conveyed over different wireless connections. Automatic repeat request, using the common link layer controller, allows for retransmission of a packet portion over a different connection than it was initially transmitted over. A wireless terminal sends connection request messages including lists of link layer identifiers associated with the wireless terminal. A base station responds with an indication of whether logical link state was already present.

40 Claims, 6 Drawing Sheets

(56) References Cited

U.S. PATENT DOCUMENTS

| | | | |
|---|---|---|---|
| 6,477,382 B1 * | 11/2002 | Mansfield et al. | 455/458 |
| 7,181,667 B2 * | 2/2007 | Argyropoulos et al. | 714/748 |
| 8,233,462 B2 | 7/2012 | Walton et al. | |
| 8,284,752 B2 | 10/2012 | Ketchum et al. | |
| 8,462,817 B2 | 6/2013 | Ketchum et al. | |
| 2002/0035682 A1 | 3/2002 | Niemi et al. | |
| 2004/0057378 A1 * | 3/2004 | Gronberg | 370/230 |
| 2005/0286500 A1 * | 12/2005 | Minami | 370/352 |
| 2007/0064948 A1 * | 3/2007 | Tsirtsis et al. | 380/270 |
| 2007/0147424 A1 * | 6/2007 | Anigstein | 370/469 |

FOREIGN PATENT DOCUMENTS

| | | |
|---|---|---|
| WO | 03019812 A1 | 3/2003 |
| WO | WO2004054181 A1 | 6/2004 |

OTHER PUBLICATIONS

Nachun Shcham et al., International Council for Computer Communication: "A Selective Repeat ARQ Protocol for Parallel Channels and Its Resequencing Analysis", Computer Communication Technologies for the 90's. Tel Aviv, Oct. 30-Nov. 3, 1988, Proceedings of the International Conference on Computer Communication, Amsterdam, Elsevier, NL, vol. CONF. 9, pp. 259-264, XP000077386, pp. 259-260, Dated: Oct. 30, 1988.

3GPP: "Mobile Radio Interface Layer 3 Specification; Core Network Protocols; Stage 3" 3GPP TS 24.008 V7.1.0 [Online], pp. 205-214, XP002437608, Retrieved From the Internet: URL:http://www.3gpp.org/ftp/Specs/archive/24_series/24.008/24008-710.zip> [retrieved on Jun. 14, 2007] pp. 210-214, Dated Oct. 3, 2005.

International Search Report and Written Opinion From International Application PCT/US2006/048725, pp. 1-12, Dated: Jun. 28, 2007.

* cited by examiner

COMMUNICATIONS METHODS AND APPARATUS FOR USING A SINGLE LOGICAL LINK WITH MULTIPLE PHYSICAL LAYER CONNECTIONS

FIELD OF THE INVENTION

The present invention relates to communications systems and, more particularly, to methods and apparatus for using a plurality of media access and physical layer connections corresponding to a single logical link control layer.

BACKGROUND OF INVENTION

Communications systems frequently include a plurality of network nodes, which are coupled to access nodes through which end nodes, e.g., mobile devices, are coupled to the network. The access nodes may be, for example, sectorized base stations, supporting a physical attachment point in each sector. Typically, each physical attachment point corresponds to a set of layers including a physical layer, a media access control (MAC) layer, and a logical link control (LLC) layer.

In certain communication systems, an end node can simultaneously have physical connections to a plurality of physical attachment points. In such cases, a plurality of sets of physical, MAC and LLC layers is typically implemented in the end node, a different one of said plurality of sets for each physical attachment point the end node is connected to. Among other things, the LLC layer is responsible for segmentation of packets of upper layers into segments that can be transported by the MAC layer, which we will call MAC frames. The MAC layer generally does not guarantee delivery, i.e., it is possible that a transmitted MAC segment is not decoded properly by the receiver. The LLC layer may implement an automatic repeat request (ARQ) protocol which re-transmits those MAC frames whose transmission has failed.

Consider an end node simultaneously having physical connections to a plurality of physical attachment points, each having independent LLC layers implementing an ARQ protocol. In this case, each upper layer packet has to be transmitted in full over one of said plurality of physical attachment points. That is each of the MAC frames an upper layer packet is segmented into by the LLC layer has to be transmitted over the same physical connection so that it is successfully re-assembled by the receiver LLC layer coupled to said physical attachment point. This poses a constraint on the access node and end node implementations that could adversely affect performance. For example in a wireless communications system the channel conditions of physical connections may vary rapidly, the condition of a physical connection could deteriorate while some of the MAC frames of an upper layer packet have already been sent over this physical connection. In such a case the transmitter could choose to keep trying to send the remaining MAC frames of said upper layer packet over the deteriorated physical connection, or to give up and restart the transmission of the upper layer packet over another physical connection.

In addition, it would also be desirable if methods and apparatus were developed which allowed for a plurality of physical points of attachment being coupled to a single LLC layer. It would be beneficial if a logical link between an end node and an access node could be supported by a plurality of physical connections. It would also be advantageous if each of the different MAC frames an upper layer packet is segmented into could be transmitted over any of the physical connections supporting a logical link.

In view of the above discussion, it should be appreciated that there is a need for methods and apparatus to implement access nodes and end nodes that allow for a plurality of simultaneous physical connections supporting a single logical link.

SUMMARY OF THE INVENTION

The present invention relates to communications systems and, more particularly, to methods and apparatus for implementing communications systems where the apparatus may include, for example, base stations (BS) which comprise a plurality of MAC and physical layer connections coupled to a single LLC layer; and/or wireless terminals which are capable of simultaneously maintaining a plurality of MAC and physical layer connections coupled to a single LLC layer.

In various embodiments of the invention, a sectorized base station provides a physical attachment point for each sector, each of these physical attachment points having an independent media access control layer, each of these supporting a single logical link control layer. Multiple physical attachment points may be under and support the same logical link control layer.

By allowing for a plurality of simultaneous physical connections supporting a single logical link, improved reliability can be achieved as multiple MAC segments of the same upper layer packet can be transmitted over different physical connections. Moreover, re-transmissions of a given MAC segment due to an ARQ protocol could be made over a physical connection different from the one the MAC segment was originally sent over, which provides diversity which can help enhance performance and save channel resources. Furthermore computing resources can be saved at both the end node and the access node, as, in such an implementation, one set of logical link control state can be maintained corresponding to the simultaneous physical connections, where otherwise multiple sets of logical link control state would need to be maintained.

In some embodiments, the end node learns whether some second physical attachment point it may try to access corresponds to the same LLC layer as a first physical attachment point it is already connected to by listening to some broadcast channel in said first physical connection which provides physical layer identifiers of other physical attachment points supporting the same LLC layer in the access node.

In some embodiments, the end node learns whether some second physical attachment point it may try to access corresponds to the same LLC layer as a first physical attachment point it is already connected to by consulting a list of other physical attachment points supporting the same LLC layer in the access node, said list having been provided to the end node in a point to point message sent while accessing said first physical attachment point.

In some embodiments, the end node learns whether some second physical attachment point it may try to access corresponds to the same LLC layer as a first physical attachment point it is already connected to while exchanging access messages with the second physical attachment point, some message from the access node to the end node including an LLC layer identifier which the end node can compare with the LLC identifier it received while accessing said first physical attachment point.

While various embodiments have been discussed in the summary above, it should be appreciated that not necessarily all embodiments include the same features and some of the features described above are not necessary but can be desirable in some embodiments. Numerous additional features, embodiments and benefits of the present invention are discussed in the detailed description which follows.

DETAILED DESCRIPTION

The methods and apparatus of the present invention for supporting a single logical link with multiple simultaneous physical layer connections between an access node, e.g., a base station, and an end node, e.g. a mobile device, can be used with a wide range of communications systems. For example the invention can be used with systems which support mobile communications devices such as notebook computers equipped with modems, PDAs, and a wide variety of other devices which support wireless interfaces in the interests of device mobility.

Figure 1:
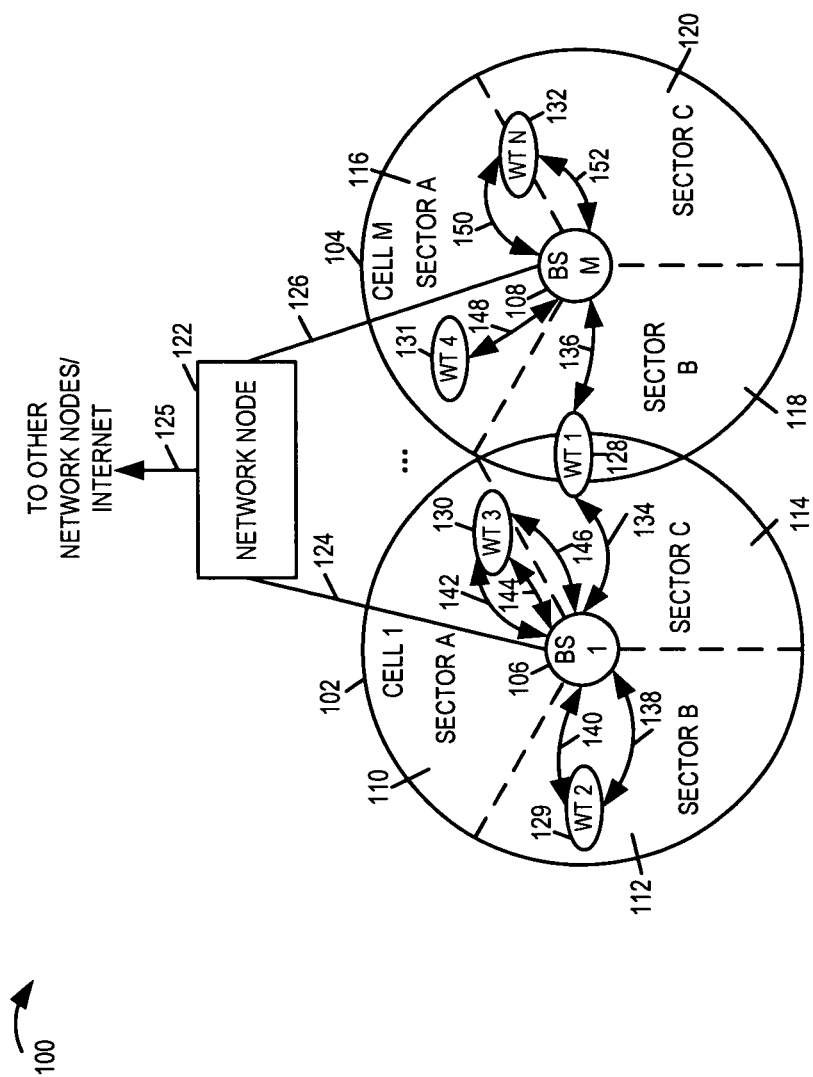
FIG. 1 illustrates a network diagram of an exemplary communications system implemented in accordance with the present invention.

FIG. 1 is a drawing of an exemplary communications system 100 implemented in accordance with the present invention and using methods of the present invention. Example communications system 100 may be, e.g., an orthogonal frequency division multiplexing (OFDM) spread spectrum multiple access wireless communications system. Exemplary communications system 100 includes a plurality of cells (cell 1 102, cell M 104), each cell (102, 104) representing a wireless coverage area for a corresponding base station (BS 1 106, BS M 108), respectively. Each base station is a sectorized base station supporting one or more different physical attachment points for each sector. Cell 1 102 includes sector A 110, sector B 112 and sector C 114; cell M 104 includes sector A 116, sector B 118, and sector C 120. Each base station sector includes one or more physical attachment points. For example, in some OFDM embodiments, each base station sector physical attachment point corresponding to a downlink/uplink tone block pair. In some such embodiments, each base station sector includes up to three different downlink/uplink tone block pairs. The base stations (106, 108) are coupled to a network node 122, e.g., a router, via networks links (124, 126), respectively. Network node 122 is coupled to other network node/Internet via network link 125. Network links (124, 126, 125) may be, e.g., fiber optic links.

Exemplary system 100 also includes a plurality of wireless terminals, e.g., mobile nodes (WT 1 128, WT 2, 129, WT 3 130, WT 4 131, . . . , WT N 132). The wireless terminals (128, 129, 130, 131, . . . , 132) may move throughout the communications system and attach to base station physical attachment points via connections. In accordance with the present invention, a WT may be, and sometimes is, attached to multiple physical attachment points simultaneously. In some such embodiments, at some times, a plurality of wireless connections, corresponding to same wireless terminal, correspond to the same link layer link. WT 1 128 is coupled to a sector C physical attachment point of BS 1 106 via wireless connection 134. WT 1 128 is also coupled to a sector B attachment point of BS M 108 via wireless connection 134. The two sector physical attachment points being used by WT 1 128 are not co-located, e.g., each sector attachment point is in a different cell. WT 2 129 is coupled to a first sector B attachment point of BS 1 106 via wireless connection 138 and is coupled to a second sector B attachment point of BS 1 106 via wireless connection 140, the first and second physical attachment points corresponding to different tone block pairs. WT 3 130 is coupled to a first sector A attachment point of BS 1 106 via wireless connection 142, is coupled to a second sector A attachment point of BS 1 106 via wireless connection 144, and is coupled to a sector C attachment point of BS 1 106 via wireless connection 146. WT 4 131 is coupled to a sector attachment point of BS M 108 via wireless connection 148. WT N 132 is coupled to sector A attachment point of BS M 108 via wireless connection 150. WT N 130 is also coupled to a sector C attachment point of BS M 108 via wireless connection 152. The two sector attachment points being used by WT N 132 are co-located, e.g., each sector attachment point is at the same base station. In some embodiments, a base station sector supports multiple physical attachment points, e.g., three downlink OFDM tone blocks, with each of the downlink tone blocks corresponding to a different network attachment point. In some such embodiments, each downlink OFDM tone block is associated with a corresponding uplink tone block. Each base station sector physical attachment point supports simultaneous wireless connections with a plurality of wireless terminals.

In various embodiments of the present invention some of the functional entities depicted in FIG. 1 may be omitted or combined. The location or placement of these functional entities in the network may also be varied in accordance with the invention.

Figure 2:
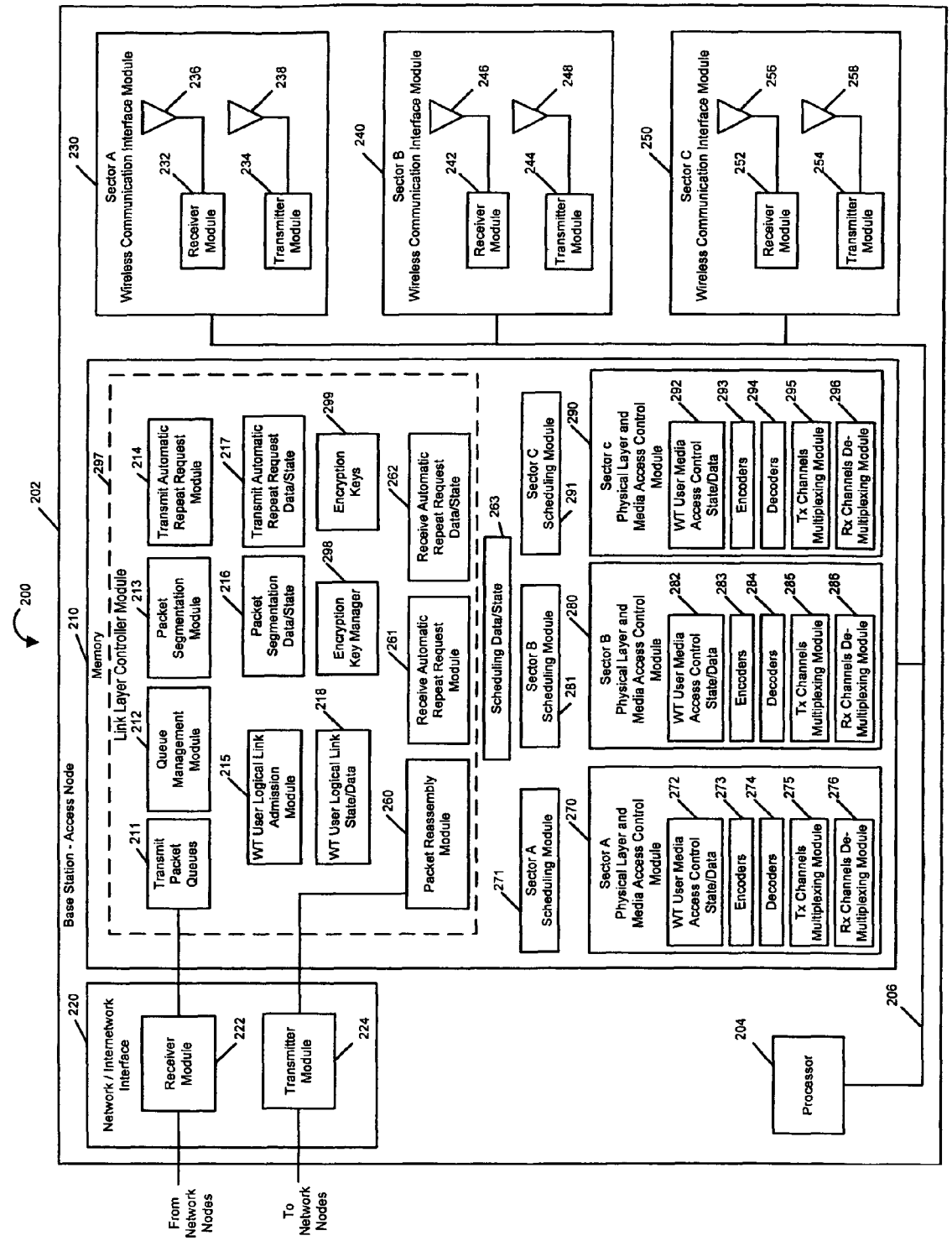
FIG. 2 illustrates an exemplary base station implemented in accordance with the present invention.

FIG. 2 is a drawing of an exemplary base station 200 implemented in accordance with the present invention and using methods of the present invention. The exemplary base station 200 is sometimes referred to an access node. Exemplary base station 200 may be any of the base stations (106, 108) of exemplary system 100 of FIG. 1.

Base station 200 includes a processor 204, a memory 210, a sector A wireless communications interface module 230, a sector B wireless communications interface module 240, a sector C wireless communications interface module 260, and a network/Internetwork interface module 220, coupled together via a bus 206 over which the various elements may interchange data and information. Memory 210 includes modules, e.g. routines, and data/information. The processor 204, e.g., a CPU, executes the routines and uses the data/information in memory 210 to control the operation of the base station 200 and implement methods of the present invention.

Sector A wireless communications interface module 230 includes a receiver module 232 and a transmitter module 234. Receiver module 232, e.g., an OFDM receiver, is coupled to sector A receiver antenna 236 via which the base station sector receives uplink signals from wireless terminals. Transmitter module 234, e.g., an OFDM transmitter, is coupled to sector A transmit antenna 238 via which the base station transmits downlink signals to wireless terminals into sector A.

Sector B wireless communications interface module 240 includes a receiver module 242 and a transmitter module 244. Receiver module 242, e.g., an OFDM receiver, is coupled to sector B receiver antenna 246 via which the base station sector receives uplink signals from wireless terminals. Transmitter module 244, e.g., an OFDM transmitter, is coupled to sector B transmit antenna 248 via which the base station transmits downlink signals to wireless terminals into sector B.

Sector C wireless communications interface module 250 includes a receiver module 252 and a transmitter module 254. Receiver module 252, e.g., an OFDM receiver, is coupled to sector C receiver antenna 256 via which the base station sector receives uplink signals from wireless terminals. Transmitter module 254, e.g., an OFDM transmitter, is coupled to sector C transmit antenna 258 via which the base station transmits downlink signals to wireless terminals into sector C.

Network/Internetwork interface 220 includes a receiver module 222 and a transmitter module 224. The Network/Internetwork interface 220 couples the base station 200 to other network nodes, e.g., routers, other base stations, AAA server nodes, home agent nodes, etc., and/or the Internet. Thus through network/Internetwork Interface 220 base station 200 is coupled to a backhaul network. A wireless terminal, coupled to base station 200 via a wireless connection corresponding to a base station 200 physical point of attachment can communicate with a peer node, e.g., another wireless terminal, using a different base station as its point of network attachment via communications through network/Internetwork Interface 220 over the backhaul network. Receiver module 222 is coupled to memory 210.

Memory 210 includes transmit packet queues 211, a queue management module 212, a packet segmentation module 213, a transmit automatic repeat request module 214, a wireless terminal user logical link admission module 215, packet segmentation data/state 216, transmit automatic repeat request data/state 217, wireless terminal user logical link state/data 218, an encryption key manager 298, encryption keys 299, a packet reassembly module 260, a receive automatic repeat request module 261, and receive automatic repeat request data/state 262.

Transmit packet queues 211 include a plurality of queues used to store data to be transmitted. Transmits packet queues 211 includes packets of user data, e.g., packets, of voice data, audio data, image data, text data, file data, etc., received from the backhaul network via receive module 222 of network/Internetwork interface 220, which are intended to be transmitted via a downlink to a wireless terminal using a base station 200 attachment point. Queue management module 212 maintains information about the amount of data stored in the queues. Queue management module 212 keeps track of packets in the queues and implements flow control policy, e.g., dropping packets when then become too old or when there are too many packets to transmit.

Packet segmentation module 213 takes at least some of the packets and splits or fragments a packet into portions, e.g., frames, suitable for transmission over the airlink. In some embodiments, the frames have a fixed frame size; in other embodiments, the frames have a variable frame size. In some embodiments, the frames are Medium Access Control (MAC) frames. Different packet portions, e.g., frames, corresponding to the same packet may be, and sometimes are, transmitted over different simultaneous wireless communications connections to a wireless terminal. Packet segmentation module 213, for at least some packets, allocates at least some packet portions, e.g., frames, of the same packet to be transmitted over different wireless connections to the same wireless terminal. Packet segmentation data/state 216 includes data and state corresponding to packet segmentation module 213, e.g., including generated packet portions, e.g., frames of user data, and state relating to packet segmentation operations such as state identifying which connection is to be used for the initial transmission of each packet portion, e.g., frame. Transmit automatic repeat request module 214 keeps tracks of which packet potions, e.g., frames, were attempted to be delivered over the airlink, which were successfully delivered over the airlink, which were unsuccessfully delivered over the airlink, and performs automatic repeat of unsuccessful transmission in accordance with the retransmission rules and procedures. Transmit automatic repeat request module 214 selects which one of a plurality of simultaneous wireless communications links connections to use for retransmission of a packet portion, e.g., frame, in response to a negative acknowledgment signal, when a plurality of simultaneous connections are available. In some such embodiments under such conditions, the transmit automatic repeat request module 214 selects a different simultaneous link, e.g., connection, from the one used to initially transmit the packet portion, e.g., frame, which resulted in the negative acknowledgement. In some embodiments, the transmit automatic repeat request module 214 determines when to retransmit a packet portion, e.g., frame, and the packet segmentation module 213 selects any one of the one or more multiple simultaneous connections to be used for the packet portion, e.g., frame, retransmission. Transmit automatic repeat request data/state 217 includes data and state corresponding to transmit automatic repeat request module 214. Transmit automatic repeat request data/state 217 includes stored information indicating which one of multiple simultaneous connections was used to retransmit a frame to a wireless terminal.

Wireless terminal user logical link admission module 215 performs WT admission operations, e.g., servicing connection requests and generating connection request response messages from wireless terminals in accordance with the methods of the present invention. Operations of module 215 include maintaining and updating logical link layer state/data 218. WT user logical link state/data 218 includes information associating physical attachment points with various wireless terminals and link layer identifiers. For example, for a given wireless terminal state/data 218 includes information associating a plurality of connections, each connection corresponding to a different physical attachment point of the base station 200, with the same link layer link. Link/state data 218 includes stored state information associated with a WT which is compared to state information received from the wireless terminal including link layer identifier lists.

Encryption key manager 298 manages encryption keys used for encryption/decryption of packet portions, e.g., frames, communicated via the one or more wireless connections, e.g., deciding which key to use at what time for each connection. Encryption keys 299 includes keys used for encrypting uplink and/or downlink traffic channel segments.

Receive automatic repeat request module 261 keeps tracks of which packet potions, e.g., frames, were successfully received over the airlink from wireless terminals and generates negative acknowledgment signals for unsuccessfully recovered packet portions, e.g., frames. Receive automatic repeat request data/state 262 includes data and state corresponding to receive automatic repeat request module 261, e.g., including frames of uplink user data associated with a packet and belonging to a link. Packet reassembly module 260 processes the receives packet portions, e.g., frames of user data communicated via uplink traffic channel segments, reassembling the packet portion, e.g., frames, to obtain packets. In some embodiments, a re-assembled packet is a composites of frames communicated via a plurality of different connections. At least some of the reassembled packets are communicated via the backhaul network via transmitter module 224 of network/Internetwork interface 220.

In some embodiments, the base station 200 includes a single link layer controller which performs link layer control for the base station thus facilitating common link layer links being implemented corresponding to multiple sectors. In some such embodiments, the link layer controller includes queue management module 212, packet segmentation module 213, transmit automatic repeat request module 214, WT user logical link admission module 215, encryption key manager 298, packet reassembly module 260, and receive automatic repeat request module 261. In some such embodiments, the link layer controller also includes transmit packet queues 211, WT user logical link state data 218, packet segmentation data/state 216, transmit automatic repeat request data/state 217, encryption keys 299, and receive automatic repeat request data/state 262. Common link layer controller module 297 of base station 200 is such an exemplary embodiment.

Memory 210 includes a sector A physical layer and Media Access Control Module 270, and a sector A scheduling module 271. Sector A scheduling module 271 decides which users, are given an assignment of one or more traffic channel segments. For example sector A scheduling module 271 allocates uplink and downlink traffic channel segments corresponding to the attachment points of sector A. The Sector A physical layer and media access control module 270 includes wireless terminal media access control state/data 272, encoders 273, decoders 274, a transmission channels multiplexing module 275, and a receiver channels de-multiplexing module 276. WT user media access control state/data 272 includes information pertaining to the state of and state transitions of the wireless terminals, e.g., On, Hold, sleep, access, and information pertaining to access operations to a sector A physical attachment point. Encoders 273 include coherent and non-coherent encoders used to encode data/information to be communicated over air link segments corresponding to a sector A wireless downlink. For example a block LDPC encoding operation is performed by encoder 273 on a set of information bits corresponding to a downlink traffic channel segment to obtain a set of coded bits which are mapped to modulation symbols. Decoders 274 include coherent and non-coherent decoders used to decode data/information received over air link segments corresponding to a sector A wireless uplink. For example, a block LDPC decoding operation is performed by decoder 274 on a set of coded information bits corresponding to an uplink traffic channel segment to obtain a set of information bits. Decoder 274 also provides information indicating whether or not the decoding operation was successful. Such information is used by the receive automatic repeat request module 262. Transmit channels multiplexing module 275 performs mapping of logical channels to segments and includes implementing downlink tone hopping. In some embodiments, transmit channel multiplexing module 275 maps some portion of different logical channel segments to the same air link resources, e.g., the same OFDM tone symbol. In some such cases the module 275 implements priority rules, e.g., a pilot segment signal punches through a traffic channel segment signal. Receive channels multiplexing module 276 performs mapping of received signals recovered from physical tones to a logical channel structure using uplink tone hopping information and channel structure information.

Memory 210 also includes a sector B physical layer and Media Access Control Module 280, and a sector B scheduling module 281. The Sector B physical layer and media access control module 280 includes wireless terminal media access control state/data 282, encoders 283, decoders 284, a transmission channels multiplexing module 285, and a receiver channels de-multiplexing module 286. Memory 210 also includes a sector C physical layer and Media Access Control Module 290, and a sector C scheduling module 291. The Sector C physical layer and media access control module 290 includes wireless terminal media access control state/data 292, encoders 293, decoders 294, a transmission channels multiplexing module 295, and a receiver channels de-multiplexing module 296. Base station 200 includes a base station housing 202 which encloses various elements of the base station 200, e.g., providing shielding for the various base station elements. Similarly named modules with respect to sectors B and C perform the same or similar functions as those previously described with respect to sector A, except that operations pertain to the corresponding sector B or C instead of A.

Figure 3:
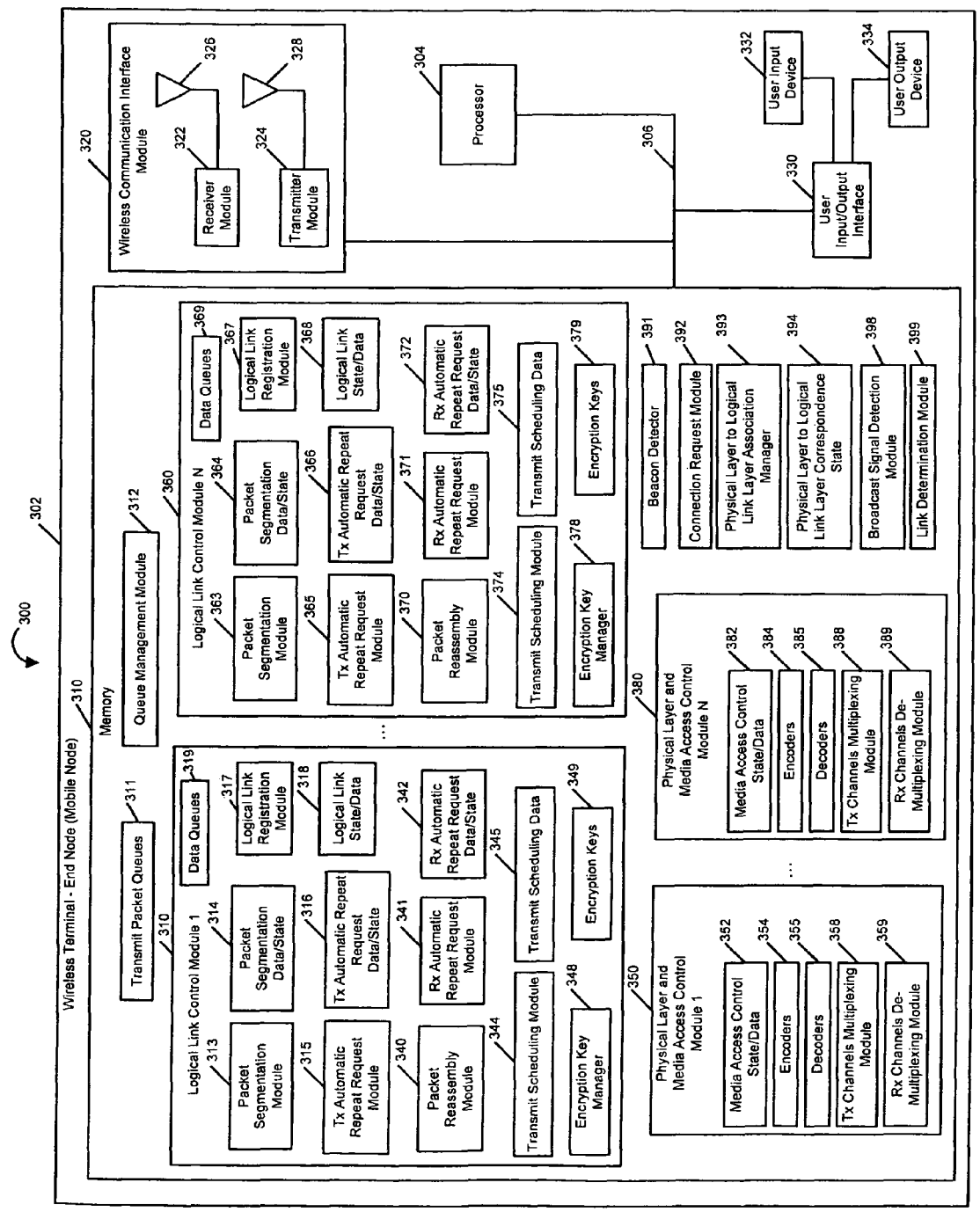
FIG. 3 illustrates an exemplary end node, e.g., wireless terminal such as a mobile node, implemented in accordance with the present invention.

FIG. 3 is a drawing of an exemplary wireless terminal 300, e.g., mobile node, implemented in accordance with the present invention and using methods of the present. Exemplary wireless terminal 300 may be any of the wireless terminals (128, 129, 130, 131, 132) of system 100 of FIG. 1.

Exemplary wireless terminal 300 includes a processor 304, a wireless communications interface module 320, a user Input/Output interface 330, and memory 310 coupled together via a bus 306 over which the various elements may interchange data and information. The memory 310 includes modules, e.g., routines, and data/information. The processor 304, e.g., a CPU, executes the routines and uses the data/information in memory 310 to control the operation of the wireless terminal and implement methods of the present invention.

Wireless terminal 300 also includes user input devices 332 and user out devices 334 which are coupled to user input/output interface 330. User input devices 332 are, e.g., microphone, keyboard, keypad, camera, switches, etc., which allow a user of WT 300 to interface with the wireless terminal 300, operate the wireless terminal 300, and input user data, e.g., voice, audio data image data, text data, file data, etc. User output devices 334 are, e.g., speaker, display, etc., which allow a user of WT 300 to interface with the wireless terminal 300 and receive output user data. User input/output interface 330 couples the user input devices 332 and user output devices 334 to bus 306 allowing the user input devices 332 and user output devices 334 to interact and exchange data/information with the processor 304, memory 310 and wireless communications interface module 320.

Wireless communication interface module 320 includes a receiver module 322 and a transmitter module 324. The receiver module 322, e.g., an OFDM receiver module, is coupled to receive antenna 326 via which the wireless terminal receives downlink signals from one or more base station sector attachment points. The transmitter module 324, e.g., an OFDM transmitter module, is coupled to transmit antenna 238 via which the wireless terminal transmits uplink signals to one or more base station sector attachment points. In some embodiments, the same antenna is used of the receiver module 322 and the transmitter module 324. Receiver module 322 is capable of simultaneously receiving downlink signals from a plurality of base station sector attachment points using the same or different downlink tone blocks, and the received signals from the different base station sector attachment points need not be synchronized. In some embodiments receiver module 322 includes two or more receiver chains, each which can be tuned separately. Transmitter module 324 is capable of simultaneously transmitting uplink signals to a plurality of base station sector attachment points using the same or different uplink tone blocks, and the transmission timing corresponding to each uplink connection is independently controlled, e.g., in a closed loop manner, to achieve proper receive signal timing at the base station sector attachment point receiver, e.g., to within the tolerance of a cyclic prefix. In some embodiments transmitter module 324 includes two or more transmitter chains, each which can be tuned separately. In some embodiments, multiple antennas are used corresponding to receiver module 322. In some embodiments, multiple antennas are used corresponding to transmitter module 324.

Memory 310 includes transmit packet queues 311, a queue management module 312, a plurality of logical link layer control modules (logical link control module 1 310, logical link control module N 360), a plurality of physical layer and media access control modules (physical layer and media access control module 1 350, . . . , physical layer and media access control module N 380), a beacon detector module 391, a connection request module 392, a physical layer to logical link layer association manger 393, physical layer to logical link layer correspondence state 394, a broadcast signal detection module 398, and a link determination module 399.

Transmit packet queues 311 include a plurality of queues used to store data to be transmitted. Transmits packet queues 311 includes packets of user data, e.g., packets, of voice data, audio data, image data, text data, file data, etc., e.g., corresponding to data/information received via user input device 332 which is intended to be transmitted via uplink connection(s) to a base station 200. Each packet, in some embodiments, corresponds to a link in the logical link layer. Queue management module 312 maintains information about the amount of data stored in the queues. Queue management module 312 keeps track of packets in the queues and implements flow control policy, e.g., dropping packets when then become too old or when there are too many packets to transmit.

Each physical layer and media access control modules (350, 380), e.g., physical layer and media access control module 350, can be associated with one of the logical link control modules (310, 360) at a given time. At different times, the same physical layer and media access control module can be associated with a different one of the logical link control modules (310, 360). One or more different physical layer and media access control modules (350, 380) can be associated at the same time with the same logical link control module. For example, at some times, in accordance with the present invention, a plurality of physical layer and media access control modules (350, 380) are coupled to a single logical link control module, e.g., module 350, with each of the plurality of physical layer and media access supporting a different physical wireless connection between the wireless terminal and a base station physical attachment point over which packet portions, e.g., frames, can be transmitted.

Logical link control module 1 310 includes data queues 319, a packet segmentation module 313, packet segmentation data/state 314, a logical link registration module 317, a transmit automatic repeat request module 315, transmit automatic repeat request data/state 316, logical link state/data 318, a packet reassembly module 340, a receive automatic repeat request module 341, receive automatic repeat request data/state 342, a transmit scheduling module 344, transmit scheduling data 345, an encryption key manager 348, and encryption keys 349.

Data queues 319 include a plurality of queues storing data, e.g., packets of data corresponding to a link layer link, to be transmitted. Data queues 319 including information of transmit packet queues 311 which corresponds to the link associated with logical link control module 1 310. Queue management module 312 maintains information about the amount of data stored in data queues 319. Queue management module 312 control the flow of packets from transmit packet queues 311 to the appropriate data queues (319, 369), e.g. based on the association with a link layer link.

Packet segmentation module 313 takes at least some of the packets, e.g., from data queue 319, and splits or fragments a packet into portions, e.g., frames, suitable for transmission over the airlink. In some embodiments, the frames have a fixed frame size; in other embodiments, the frames have a variable frame size. In some embodiments, the frames are Medium Access Control (MAC) frames. Different packet portions, e.g., frames, corresponding to the same packet may be, and sometimes are, transmitted over different simultaneous wireless communications connections to a wireless terminal. Packet segment module 313, for at least some packets, allocates at least some packet portions, e.g., frames, of the same packet to be transmitted over different wireless connections to the same wireless terminal. Packet segmentation data/state 316 includes data and state corresponding to packet segmentation module 313, e.g., including generated packet portions, e.g., frames of user data, and state relating to packet segmentation operations such as state identifying which connection is to be used for the initial transmission of each packet portion, e.g., frame. Transmit automatic repeat request module 315 keeps tracks of which packet potions, e.g., frames, were attempted to be delivered over the airlink, which were successfully delivered over the airlink, which were unsuccessfully delivered over the airlink, and performs automatic repeat of unsuccessful transmission in accordance with the retransmission rules and procedures. Transmit automatic repeat request module 315 selects which one of a plurality of simultaneous communications wireless connections to use for retransmission of a packet portion, e.g., frame, in response to a negative acknowledgment signal, when a plurality of simultaneous connections are available. In some such embodiments under such conditions, the transmit automatic repeat request module 315 selects a different simultaneous connection, from the one used to initially transmit the packet portion, e.g., frame, which resulted in the negative acknowledgement. In some embodiments, the transmit automatic repeat request module 315 determines when to retransmit a packet portion, e.g., frame, and the packet segmentation module 313 selects any one of the one or more multiple simultaneous connections, currently associated with the logical link control module 1 310, to be used for the packet portion, e.g., frame retransmission. Transmit automatic repeat request data/state 316 includes data and state corresponding to transmit automatic repeat request module 315. Transmit automatic repeat request data/state 316 includes stored information indicating which one of multiple simultaneous connections was used to retransmit a frame to a wireless terminal.

Logical link registration module 317 performs registration operations pertaining to the logical link layer. Logical link state/data 318 includes logical link layer identification information.

Receive automatic repeat request module 341 keeps tracks of which packet potions, e.g., frames, were successfully received over the airlink from a base station and generates negative acknowledgment signals for unsuccessfully recovered packet portions, e.g., frames. Receive automatic repeat request data/state 342 includes data and state corresponding to receive automatic repeat request module 341, e.g., including frames of downlink user data associated with a packet and belonging to the link corresponding to logical link control module 1 310. Packet reassembly module 340 processes the received packet portions, e.g., frames of user data communicated via downlink traffic channel segments, reassembling the packet portion, e.g., frames, to obtain packets. In some embodiments for at least some re-assembled packets, a re-assembled packet is a composites of frames communicated via a plurality of different connections. At least some of the reassembled packets and/or data represented by the reassembled packet is communicated to a user output device 334.

Encryption key manager 348 manages encryption keys used for encryption/decryption of packet portions, e.g., frames, communicated via the one or more wireless connections, e.g., deciding which key to use at what time for each connection. Encryption keys 349 include keys used for encrypting uplink and/or downlink traffic channel segments.

Transmit scheduling module 344 schedules packet portions, e.g., frames of user data/information, to an uplink traffic channel segment corresponding to one of the physical attachments points currently associated with the link corresponding to logical link control module 1 310. Transmit scheduling data 345 is data which corresponds to transmit scheduling module 344 and includes timing structure information identifying uplink segments, e.g., indexed uplink traffic channel segments in a recurring timing structure being used by a base station physical attachment point.

Physical layer and Media Access Control Module 1 350 can correspond to a connection between the wireless terminal 300 and a base station physical attachment point, e.g., each base station physical attachment point corresponding to a base station, sector, and downlink/uplink tone block pair. For example, physical layer and media access control module 1 350, in some embodiments, corresponds to a first physical interface in wireless communications interface module 320 which is selectable to tune to a downlink/uplink tone block pair. At different times physical layer and media access control module 1 350 is associated with a different physical attachment point in the system. In the exemplary embodiment physical layer and media access control module 1 350, at any given time when it corresponds to a wireless connection, corresponds to one wireless connection, and is associated with at most one logical link layer. Physical layer and media access control module 1 350 includes media access control state/data 352, encoders 354, decoders 355, a transmit channels multiplexing module 358, and a receive channels de-multiplexing module 359.

Media access control state/data 352 includes information pertaining to the state of and state transitions of the wireless terminals, e.g., On, Hold, sleep, access, and information pertaining to access operations of the wireless terminal with respect to the physical attachment point and connection currently associated with module 1 350. Encoders 354 include coherent and non-coherent encoders used to encode data/information to be communicated over air link segments. For example a block LDPC encoding operation is performed by encoder 354 on a set of information bits or grouping of one or more MAC frames corresponding to an uplink traffic channel segment to obtain a set of coded bits which are mapped to modulation symbols. Decoders 355 include coherent and non-coherent decoders used to decode data/information received via downlink signals over air link segments corresponding to connection. For example, a block LDPC decoding operation is performed by decoder 274 on a set of coded information bits corresponding to a downlink traffic channel segment to obtain a set of information bits, the set of information bits representing one or more MAC frames of user data. Decoders 355 also determine whether or not a downlink traffic channel segment was successfully decoded and generate information indicative of the status of the decoding operation. Such information is used by the received automatic repeat request module of the logical link module corresponding to the connection. Transmit channels multiplexing module 358 performs mapping of logical uplink channels to segments and includes implementing uplink tone hopping. Receive channels multiplexing module 359 performs mapping of received signals recovered from physical tones to a logical channel structure using downlink tone hopping information and downlink channel structure information.

Logical link control module N 360 includes a packet segmentation module 363, packet segmentation data/state 364, a logical link registration module 367, a transmit automatic repeat request module 365, transmit automatic repeat request data/state 366, logical link state/data 368, a packet reassembly module 370, a receive automatic repeat request module 371, receive automatic repeat request data/state 372, a transmit scheduling module 374, transmit scheduling data 375, an encryption key manager 378, and encryption keys 379.

Physical layer and media access control module N 380 includes media access control state/data 382, encoders 384, decoders 385, a transmit channels multiplexing module 388, and a receive channels de-multiplexing module 389.

Elements of module 360 similarly named to elements of module 310 perform the same function and/or include the same type of information as described with respect to module 310; however, the element of module 360 are with respect to a different link layer link. Elements of module 380 similarly named to elements of module 350 perform the same function and/or include the same type of information as described with respect to module 350; however, the element of module 380 are at any given time with respect to a different wireless connection and different physical base station physical attachment point.

Beacon detector 391 is used for monitoring for physical attachment points. The beacon detector 391 detects beacon signals, e.g., a beacon signal being a relatively high power broadcast signals on a per tone basis with energy concentrated on a single or few tones, the beacon signals being used to convey a cell identifier, e.g., a slope value and/or a sector identifier or sector type identifier. Locally different physical base station attachments points, communicate different beacon signals.

Connection request module 392 generates a connection request message to be transmitted to a target base station requesting that the base station establish a wireless connection with the wireless terminal. In some embodiments, the connection request message identifies the base station sector attachment point to which the wireless terminal is seeking to establish a connection. In some embodiments at some times, the connection request message includes a list of link layer identifier(s) corresponding to existing connections of the wireless terminal, e.g., a list including one logical link layer identifier identifying a logical link layer with which the wireless terminal has an existing connection. Connection request module 392 also processes received connection request response messages from base stations.

Physical layer to logical link layer association manager module 393 coordinates the association of each physical layer and media access control module (350, 380), with one of logical link control modules (310, 360), each association mapping each wireless terminal connection associated with a base station sector physical attachment point to a logical link layer. Manager module 393 stores, in response to determining that a received logical link layer identifier corresponds to a logical link layer to which the wireless terminal already has a connection, information associating the physical attachment point to which the wireless terminal may connect with the logical link layer to which the wireless terminal already has a connection. Physical layer to logical link layer correspondence state 394 includes state information used, updated and maintained by manager module 393. Processed received connection request response messages are also evaluated to update state 394. Physical layer to logical link layer correspondence state 394, at some times, includes stored information associating a base station physical attachment point to which the wireless terminal may connect with a logical link layer to which the wireless terminal already has an existing associated connection corresponding to a different base station attachment point.

Broadcast signal detection module 398 detects and processes broadcast signals transmitted on a recurring basis from access nodes, said broadcast signals including logical link layer information. A wireless terminal, in some embodiments, learns whether some second physical attachment point it may try to access corresponds to the same logical link control layer as a first physical attachment point it is already connected to by listening to some broadcast channel in the first physical connection which provides physical layer identifiers of other physical attachment points supporting the same LLC layer in the access node.

Link determination module 399 determines if a received logical link layer identifier corresponds to a logical link layer to which the wireless terminal already has a corresponding connection. For example, the received logical link layer identifier may be received in a connection request response signal from a target access node, and the received logical link layer identifier identifies a logical link corresponding to a physical connection point to which the wireless terminal may connect.

Figures 4, 4A:
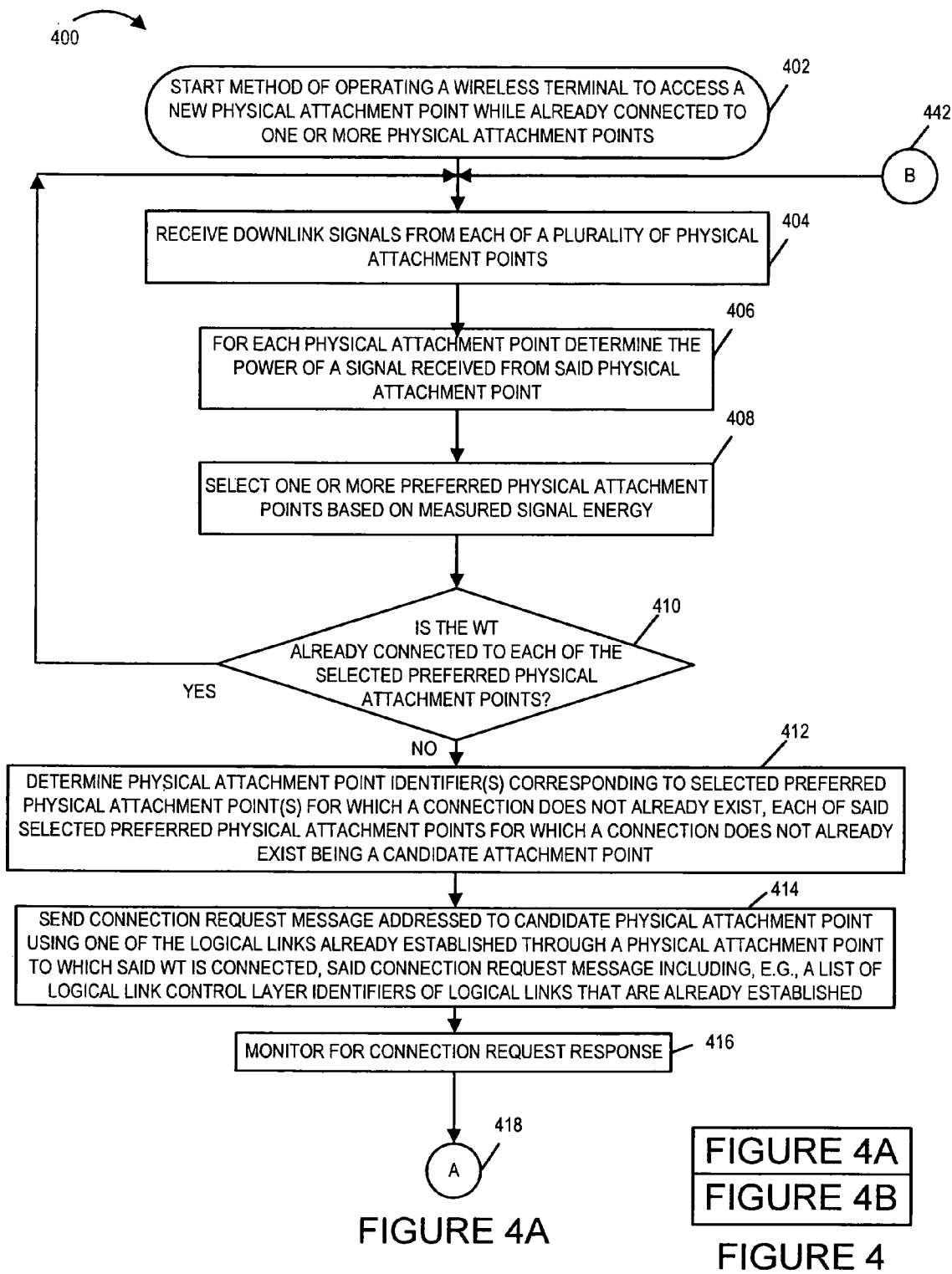
FIG. 4 comprising the combination of FIG. 4A
Figure 4B:
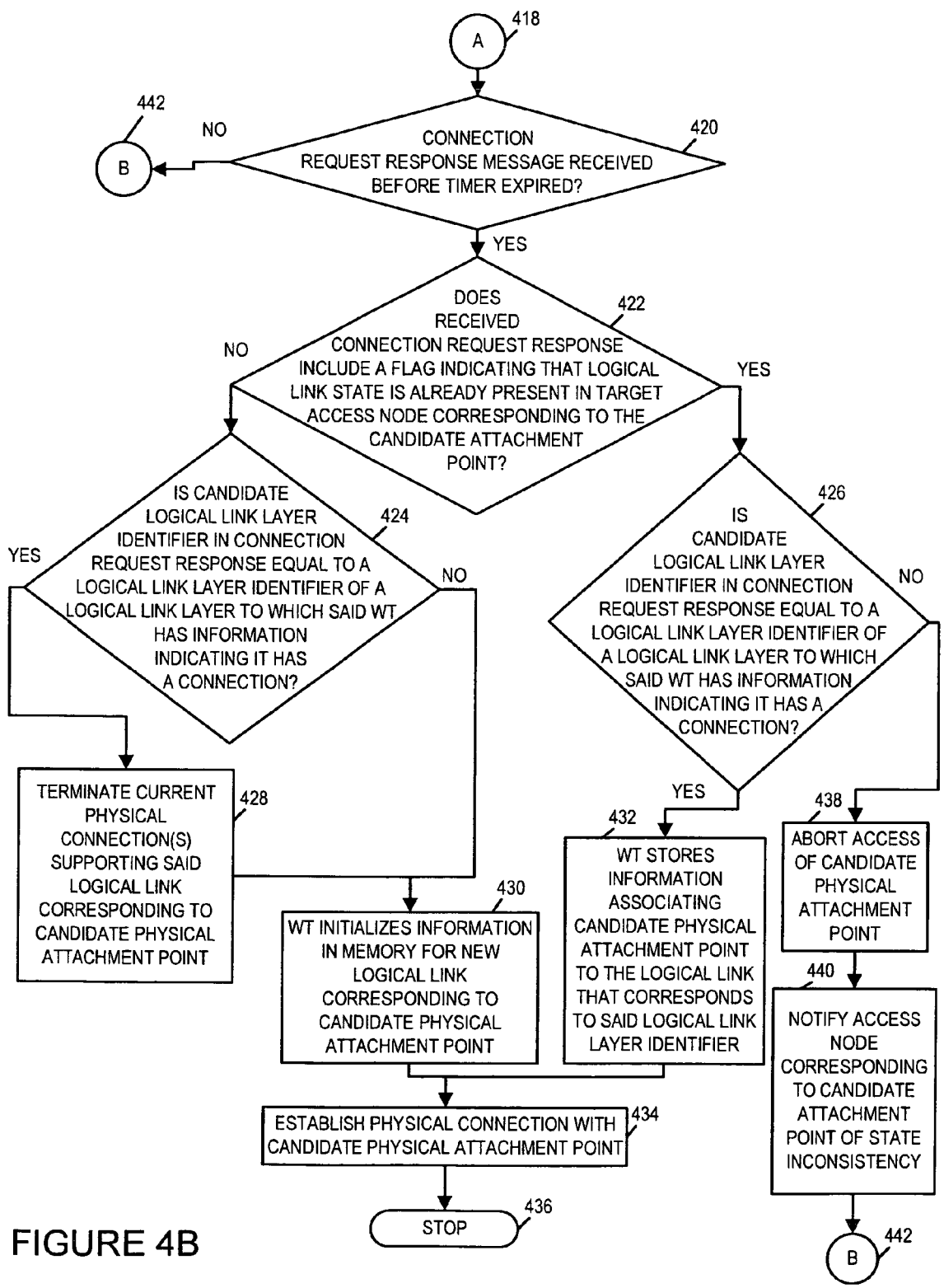
FIG. 4B is a drawing of flowchart of an exemplary method of operating a wireless terminal to access a new physical attachment point while already connected to one or more physical attachment points, in accordance with the present invention.

FIG. 4 is a flowchart 400 of an exemplary method of operating a wireless terminal to access a new physical attachment point while already connected to one or more physical attachment points, in accordance with the present invention. The exemplary method starts in step 402, where the wireless terminal is already connected to one or more physical attachment points. Operation proceeds from start step 402 to step 404. In step 404, the wireless terminal receives downlinks signals from a plurality of physical attachment points. In some embodiments, the received downlink signals include pilot signals and/or beacon signals. Operation proceeds from step 404 to step 406. In step 406, the wireless terminal, for each of the physical attachment points, determines the power of a signal received from the physical attachment point. Operation proceeds from step 406 to step 408. In step 408, the wireless terminal selects one or more preferred physical attachment points based on measured signal energy. Then, in step 410, the wireless terminal checks as to whether the wireless terminal is already connected to each of the selected preferred physical attachment points, and proceeds based on the result. If the wireless terminal is already connected to each of the selected preferred physical attachment points, then operation proceeds from step 410 to step 404, where the wireless terminal receives downlink signals from each of a plurality of physical attachment points. However, if the wireless terminal is not connected to each of the selected preferred physical attachment points, then operation proceeds from step 410 to step 412.

In step 412, the wireless terminal determines physical attachment point identifier(s) corresponding to selected preferred physical attachment point(s) for which a connection does not already exist, each of said selected preferred physical attachment points for which a connection does not exist being a candidate attachment point. Operation proceeds from step 412 to step 414.

In step 414, the wireless terminal sends a connection request message addressed to a candidate physical attachment point using one of the logical links already established through a physical attachment point to which said wireless terminal is connected, said request message including, e.g., a list of logical link control layer identifiers of logical links that are already established. Operation proceeds from step 414 to step 416. In step 416, the wireless terminal monitors for a connection response message. Operation proceeds from step 416 via connecting node A 418 to step 420.

In step 420, the wireless terminal checks as to whether a connection request response message is received in response to the connection request message sent in step 414 before a timer has expired, e.g., a timer which was started when the connection request message of step 414 was sent. If the monitoring of step 416 did not indicate that a connection response message was received before the timer expired, operation proceeds from step 420 via connecting node B 442 to step 404, where the wireless terminal receives downlink signals from each of a plurality of physical attachment points. If the monitoring of step 416, indicated that a connection response message was received before the timer expired, operation proceeds from step 420 to step 422.

In step 422, the wireless terminal checks as to whether or not the received connection response includes a flag indicating that logical link state is already present in the target access node corresponding to the candidate attachment point, and proceeds based on the result. If it is determined that the received connection request response does not include a flag indicating that logical state is already present in the target access node corresponding to the candidate attachment point, then operation proceeds from step 422 to step 424. If it is determined that the received connection request response does include a flag indicating that logical state is already present in the target access node corresponding to the candidate attachment point, then operation proceeds from step 422 to step 426.

In step 424 the wireless terminal checks as to whether or not the candidate logical link layer identifier in the connection request response is equal to a logical link layer identifier to which said wireless terminal has information indicating it has a connection and proceeds based on the result. If the check indicates that the candidate logical link layer identifier in the connection request response does equal a logical link layer identifier of a logical link layer to which the wireless terminal has information indicating it has a connection operation proceeds to step 428, where the wireless terminal terminates current physical connection(s) supporting the logical link corresponding to the candidate physical attachment point. Step 428 is being performed because there is a discrepancy between an access node's understanding of a logical link and associated current physical connections corresponding to the wireless terminal and the wireless terminal's understanding; the access node has information indicating that an association does not exists, while the wireless terminal has information indicating that an association exists. Operation proceeds from step 428 to step 430. However, if the check of step 424 indicates that the candidate logical link layer identifier in the connection request response does not equal a logical link layer identifier of a logical link layer to which the wireless terminal has information indicating it has a connection operation proceeds to step 430.

In step 430, the wireless terminal initializes information in memory for the new logical link corresponding to the candidate physical attachment point. Operation proceeds from step 430 to step 434. In step 434, the wireless terminal establishes a physical connection with the candidate physical attachment point. Operation proceeds from step 434 to stop step 436.

Returning to step 426, in step 426 the wireless terminal checks as to whether or not the candidate logical link layer identifier in the connection request response is equal to a logical link layer identifier to which said wireless terminal has information indicating it has a connection and proceeds based on the result. If the check indicates that the candidate logical link layer identifier in the connection request response does equal a logical link layer identifier of a logical link layer to which the wireless terminal has information indicating it has a connection operation proceeds to step 432, where the wireless terminal stores information associating the candidate physical attachment point to the logical link that corresponds to the logical link layer identifier. Operation proceeds from step 432 to step 434. However, if the check of step 426 indicates that the candidate logical link layer identifier in the connection request response does not equal a logical link layer identifier of a logical link layer to which the wireless terminal has information indicating it has a connection operation proceeds to step 438, where the wireless terminal aborts access of the candidate physical attachment point, and then in step 440 notifies the access node corresponding to the candidate attachment point of state inconsistency. Step 438 and 440 are being performed because there is a discrepancy between an access node's understanding of a logical link and associated current physical connections corresponding to the wireless terminal and the wireless terminals understanding; the access node has information indicating that an association does exists, while the wireless terminal has information indicating that an association does not exist. Operation proceeds from step 440 via connecting node B 442 to step 404, where the wireless terminal receives downlink signals from each of a plurality of physical attachment points.

Figure 5:
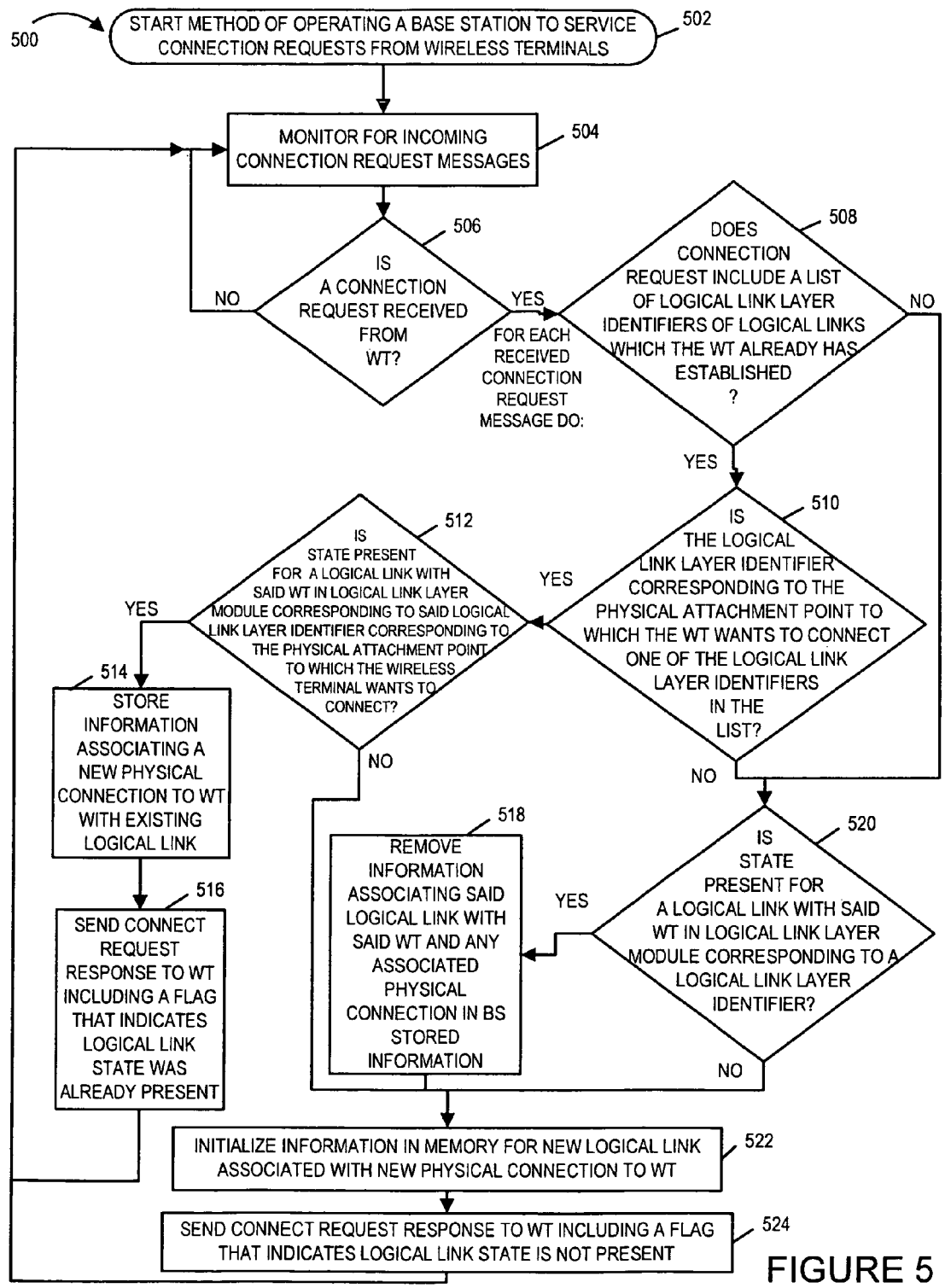
FIG. 5 is a flowchart of an exemplary method of operating a base station to service connection requests from wireless terminals in accordance with the present invention.

FIG. 5 is a flowchart 500 of an exemplary method of operating a base station to service connection requests from wireless terminals in accordance with the present invention. Operation starts in start step 502 and proceeds to step 504. In step 504, the wireless terminal monitors for incoming connection request messages. In step 504, the base station checks as to whether or not a connection request is received from a wireless terminal. If a received connection request is not received from a wireless terminal, then operation proceeds to step 504, where the wireless terminal continues monitoring for incoming connection request messages. If a connection request is received from a wireless terminal operation proceeds from step 506 to step 508, for each received connection request message.

In step 508 the base station checks as to whether or not the connection request includes a list of logical link layer identifiers of logical links which the wireless terminal has already established and proceeds based on the result of the check. If the base station determines that the connection request does include a list of logical link layer identifiers of logical links which the wireless terminal has already established, then operation proceeds from step 508 to step 510; otherwise operation proceeds from step 508 to step 520.

In step 510, the base station checks as to whether or not the logical link layer identifier corresponding to the physical attachment point to which the wireless terminal wants to connect is one of the logical link layer identifiers in the list. If in step 510, the base station determines that the logical link layer corresponding to the physical attachment point to which the wireless terminal wants to connect is one of the logical link layer identifiers in the list, then operation proceeds to step 512; otherwise operation proceeds to step 520.

In step 512, the base station performs a check and proceeds based on the result of the check. If state is present for a logical link with said wireless terminal in a logical link layer module corresponding to said logical link layer identifier corresponding to the physical attachment point to which the wireless terminal wants to connect, then operation proceeds from step 512 to step 514; otherwise operation proceeds from step 512 to step 522.

In step 514, the base station stores information associating the new physical connection to the wireless terminal with the existing logical link, and then in step 516 the base station sends a connect request response to the wireless terminal including a flag that indicates logical link state was already present present. In some embodiments, the base station includes the logical link layer identifier corresponding to the new physical connection in the connection request response message. Operation proceeds from step 516 to step 504.

Returning to step 520, in step 520, the base station performs a check and proceeds based on the result of the check. If there is state present for a logical link with said wireless terminal in a logical link layer module corresponding to a logical link layer identifier, then operation proceeds from step 520 to step 518; otherwise operation proceeds from step 520 to step 522.

If operation proceeds to step 518, there is a misunderstanding between the wireless terminal and the base station in regards to established logical link layer identifiers pertaining to the wireless terminal. For example, the wireless terminal may have previously dropped or terminated a connection which was previously associated with the link layer identifier, but the base station may be unaware of the loss of connection and thus have some stale state information associated with the WT and the logical link identifier stored in its memory. In step 518, the base station removes information associating said logical link with said wireless terminal and any associated physical connections in base station stored information. Operation proceeds from step 518 to step 522.

In step 522 the base station initializes information in memory for new logical link associated with new physical connection to wireless terminal. Operation proceeds from step 522 to step 524. In step 524, the base station sends a connection request response to the wireless terminal including a flag that indicates logical link state is not present. In some embodiments, the connection request response includes a logical link layer identifier corresponding to the new physical connection in the request response message. Operation proceeds from step 524 to step 504.

In some embodiments, a base station includes a plurality of sectors and each sector corresponds to one or more physical attachment points, e.g., corresponding to different carriers. In some such embodiments each of the physical attachment points of the base station use the same logical link layer controller. In some such embodiments, a wireless terminal can have simultaneous connections corresponding to the same link layer link, each connection using a different one of the base station's physical attachment points.

In one exemplary embodiment, a three sector base station includes nine different base station sector attachment points, each base station sector including three different base station sector attachment points corresponding to three different downlink/uplink tone block pairs, and each of the nine base station sector attachment points uses the same logical link layer controller. In some such embodiments, a wireless terminal can have simultaneous connections corresponding to the same link layer link, each connection using a different one of any of the base station's physical attachment points.

In some embodiments, a base station includes a plurality of sectors and each sector corresponds to one or more physical attachment points. In some such embodiments each of the physical attachment points of the base station using the same type of tone block pair use the same logical link layer controller. For example, in one embodiment, a three sector base station includes nine different base station attachment points, each sector including three different physical attachment points associated with three different tone block pairs or three different carrier frequency pairs ($f_{1DL}/f_{1UL}$, $f_{2DL}/f_{2UP}$, $f_{3DL}/f_{3UL}$), uses three logical link layer controllers, a first controller associated with the three physical attachment points corresponding to a first tone block or carrier frequency pair, a second controller associated with the three physical attachment points corresponding to a second tone block or carrier frequency pair, and a third controller associated with the three physical attachment points corresponding to a second tone block or carrier frequency pair. In some such embodiments, a wireless terminal can maintain simultaneous connections corresponding to the same link layer link to physical attachment point in different sector which correspond to the same logical link controller.

In some other embodiments, a base station includes a plurality of sectors and each sector corresponds to a plurality of physical attachment points. In some such embodiments each of the plurality of physical attachment points of the base station using the same sector use the same logical link layer controller. For example, a three sector base station includes nine different base station attachment points, each sector including three different physical attachment points associated with three different tone block pairs or three different carrier frequency pairs ($f_{1DL}/f_{1UL}$, $f_{2DL}/f_{2UP}$, $f_{3DL}/f_{3UL}$), uses three logical link layer controllers, a first controller associated with the three first sector attachment points, a second controller associated with the three second sector attachment points and a third controller associated with the three third sector attachment points. In some such embodiments, a wireless terminal can maintain simultaneous connections corresponding to the same link layer link to multiple physical attachment point in a sector, e.g., using different tone blocks pairs or different carrier frequency pairs.

Numerous combinations and variations of base station logical link layer controller implementations are possible in accordance with the present invention, wherein a plurality of different physical attachment points in the base station are structured under a common link layer controller, and wherein a wireless terminal can, and sometimes does maintain a plurality of simultaneous wireless connections using different ones of the attachment points for a single link layer link.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications apparatus, comprising:
a logical link layer control circuit including a segmentation circuit for segmenting a packet into frames to be transmitted;
a plurality of physical layer connection circuits coupled to said logical link layer control circuit, wherein each physical layer connection circuit is configured to maintain a separate communications link with a first node, and wherein multiple simultaneous communications links to the first node are supported through different physical layer connection circuits;
memory comprising stored information for indicating which one of said multiple simultaneous communications links was used to transmit a frame to said first node; and
a transmitter for transmitting the frames over the different physical layer connection circuits,
wherein said logical link layer control circuit comprises a first logical link layer state, said first logical link layer state configured to provide common logical link layer control for each of said multiple simultaneous communications links, and
wherein said segmentation circuit is configured to segment at least some packets directed to said first node and to allocate at least some frames of a packet to be transmitted over different ones of said multiple simultaneous communications links.

2. The communications apparatus of claim 1, wherein said logical link layer control circuit comprises a frame retransmission control circuit for selecting which one of said multiple simultaneous communications links is to be used for retransmission of a frame to said first node in response to a negative acknowledgment signal and
wherein said retransmission control circuit is configured to select a different one of said multiple simultaneous communications links from the one used to initially transmit the frame which resulted in said negative acknowledgment.

3. The communications apparatus of claim 1, further comprising a retransmission control circuit for determining when to retransmit a frame, said segmentation circuit for selecting any one of said multiple simultaneous communications links for said frame retransmission.

4. The communications apparatus of claim 1, wherein said first logical link layer state comprises an encryption key for encrypting frames to be sent over different ones of said multiple simultaneous communications links with said first node,
wherein different ones of said plurality of physical layer connection circuits comprise different connection state information for connections to said first node.

5. The communications apparatus of claim 1, wherein different ones of said physical layer connection circuits comprise different connection state information for connections to said first node, and
   wherein the different connection state information indicates different control channel modes of operation for different ones of said plurality of physical layer connections to said first node.

6. The communications apparatus of claim 1, wherein said frames are one of a fixed frame size or a variable frame size; and wherein said frames are Medium Access Control (MAC) frames.

7. A method of operating a wireless terminal, comprising:
   receiving by a receiver a signal from a target access node, said signal comprising a logical link layer identifier for identifying a logical link corresponding to a physical connection point to which said wireless terminal may connect;
   prior to receiving said signal, receiving broadcast signals from which physical attachment point identifiers are determined; and
   determining by a processor if the received logical link layer identifier corresponds to a logical link layer to which said wireless terminal already has a corresponding connection.

8. The method of claim 7, wherein said signal from the target access node is a connection request response, the method further comprising transmitting by a transmitter a connection request to said target access node prior to receiving said connection request response.

9. The method of claim 8, further comprising:
   determining by the processor if an indicator in said signal from said target access node indicates that the target access node comprises the logical link layer state corresponding to said wireless terminal;
   in response to determining that the indicator in said signal from said target access node indicates that the target access node does not comprise the logical link layer state corresponding to said wireless terminal, and that the received logical link layer identifier corresponds to a logical link layer to which said wireless terminal already has a connection,
   terminating by the processor a physical connection corresponding to said logical link corresponding to said physical connection point to which said wireless terminal may connect; and
   in response to determining that the indicator in said signal from said target access node indicates that the target access node does not comprise the logical link layer state corresponding to said wireless terminal, and that the received logical link layer identifier corresponds to a logical link layer to which said wireless terminal already has a connection,
   initializing by the processor information in memory corresponding to the logical link corresponding to said physical connection point to which said wireless terminal may connect as part of establishing a new connection with said logical link.

10. The method of claim 7, further comprising:
    in response to determining that the received logical link layer identifier corresponds to the logical link layer to which said wireless terminal already has a corresponding connection, storing information by the processor associating the physical connection point to which said wireless terminal may connect with said logical link layer to which said wireless terminal already has a connection;
    in response to determining that the received logical link layer identifier does not correspond to the logical link layer to which said wireless terminal already has a corresponding connection, aborting connection to said physical connection point to which said wireless terminal may connect,
    wherein said step of aborting is conditional upon a determination that an indicator in said received signal indicates the target access node includes a logical link layer state corresponding to said wireless terminal.

11. A wireless terminal comprising:
    a receiver for
       receiving a signal from a target access node, said signal including a logical link layer identifier for identifying a logical link corresponding to a physical connection point to which said wireless terminal may connect;
       prior to receiving said signal, receiving broadcast signals from which physical connection point identifiers are determined; and
    a link determination circuit for determining if the received logical link layer identifier corresponds to a logical link layer to which said wireless terminal already has a corresponding connection.

12. The wireless terminal of claim 11, further comprising:
    a connection request circuit for generating a connection request to be transmitted to said target base station prior to receiving said signal from said target access node; and
    a transmitter for transmitting said connection request,
    wherein said signal from the target access node is a connection request response.

13. The wireless terminal of claim 12, wherein said connection request includes at least one logical link layer identifier for identifying the logical link layer with which the wireless terminal has the existing connection.

14. The wireless terminal of claim 11, further comprising:
    a memory comprising stored information for associating the physical connection point to which said wireless terminal may connect with said logical link layer to which said wireless terminal already has the connection; and
    a memory management circuit for storing, in response to determining that the received logical link layer identifier corresponds to a logical link layer to which said wireless terminal already has a connection, said information associating the physical connection point to which said wireless terminal may connect with said logical link layer to which said wireless terminal already has a connection.

15. A method of operating a wireless terminal, comprising:
    receiving by a receiver a signal, said signal indicating that a logical link state is present in one or more access nodes corresponding to one or more respective physical attachment points for which a physical layer connection does not already exist, said one or more physical attachment points being identified by one or more respective physical attachment point identifiers; and
    storing information by a processor in memory associating said one or more physical attachment point identifiers with a logical link identifier for identifying a logical link with which said wireless terminal has a logical connection.

16. The method of claim 15, further comprising:
    determining by the processor said one or more physical attachment point identifiers from one or more respective downlink signals received from said one or more access nodes; and determining by the processor from said stored information and said one or more determined physical attachment point identifiers if a physical attachment point corresponding to one of said one or more determined physical attachment point identifiers corresponds to the logical link with which said wireless terminal has the logical connection.

17. The method of claim 15, wherein said receiving of said signal indicating that the logical link state is present in said one or more access nodes corresponding to said one or more respective physical attachment points for which the physical layer connection does not already exist comprises receiving said signal over a communications link corresponding to said logical link with which said wireless terminal has the logical connection.

18. A method of operating a base station to service a connection request from a wireless terminal for establishing a connection with a physical attachment point of the base station, the method comprising:
  receiving by a receiver a connection request from a wireless terminal, said connection request requesting establishment of the connection with the physical attachment point of said base station;
  determining by a processor if said received connection request includes a logical link layer identifier corresponding to said physical attachment point of said base station, and if said base station includes a stored state for associating a wireless terminal identifier corresponding to said wireless terminal with said logical link layer identifier; and
  establishing by the processor a connection between the wireless terminal and the physical attachment point of said base station.

19. The method of claim 18, further comprising:
  when it is determined that said received connection request includes the logical link layer identifier corresponding to said physical attachment point of said base station, and that said base station includes the stored state for associating the wireless terminal identifier corresponding to said wireless terminal with said logical link layer identifier, performing the additional step of:
  storing information by the processor associating said physical attachment point with said wireless terminal and said logical link layer identifier.

20. The method of claim 19, wherein said storing of the information results in said wireless terminal identifier being associated in said base station with said logical link layer identifier and multiple physical attachment points through which said wireless terminal communicates with a logical link layer identified by said logical link layer identifier.

21. The method of claim 19, further comprising:
  sending by a transmitter a connection request response to said wireless terminal indicating that a logical link layer state was already present in said base station associating said wireless terminal with said logical link layer identifier,
  wherein said connection request comprises a plurality of logical link layer identifiers and wherein said connection request response comprises one of the plurality of logical link layer identifiers included in said connection request determined by said base station to correspond to said physical attachment point.

22. The method of claim 19, wherein said connection request response is received from a base station with which said wireless terminal has an existing physical connection via a backhaul link between said base station and another base station with which said wireless terminal has an existing connection.

23. The method of claim 19, wherein the base station with which said wireless terminal has an existing physical connection is the same as said base station, said connection request being received through a physical attachment point which is different from said physical attachment point,
  wherein said physical attachment point corresponds to a different carrier than the physical attachment point with which said wireless terminal has an existing physical connection.

24. The method of claim 19, further comprising:
  when it is determined that said received connection request does not include the logical link layer identifier corresponding to said physical attachment point of said base station, but that said base station includes the stored state for associating the wireless terminal identifier corresponding to said wireless terminal with said logical link layer identifier, performing the additional steps of:
  removing information by the processor associating said logical link layer identifier with said wireless terminal and any associated physical connection identified in said stored information;
  storing new information associating said logical link layer identifier with said wireless terminal and said physical attachment point to which said wireless terminal is requesting to connect; and
  sending a connection request response message to the wireless terminal, said connection request response message indicating that information indicating an association between the wireless terminal and said logical link layer identifier corresponding to said physical attachment point of said base station was not determined to be present in said base station.

25. The method of claim 18, further comprising:
  when it is determined that said received connection request does not include the logical link layer identifier corresponding to said physical attachment point of said base station, and that said base station does not include the stored state for associating the wireless terminal identifier corresponding to said wireless terminal with said logical link layer identifier, performing the steps of:
  storing information associating said logical link layer identifier with said wireless terminal and said physical attachment point to which said wireless terminal is requesting to connect; and
  sending a connection request response message to the wireless terminal, said connection request response message indicating that information indicating an association between the wireless terminal and said logical link layer identifier corresponding to said physical attachment point of said base station was not determined to be present in said base station.

26. A base station comprising:
  a receiver for receiving a connection request from a wireless terminal seeking to establish a connection with a physical attachment point of the base station; and
  a determination circuit for determining if said received connection request includes a logical link layer identifier corresponding to said physical attachment point and if said base station includes a stored state for associating a wireless terminal identifier corresponding to said wireless terminal with said logical link layer identifier.

27. The base station of claim 26, further comprising:
  a storage device for storing information associating said physical attachment point with said wireless terminal and said logical link layer identifier when it is determined that said received connection request includes a logical link layer identifier corresponding to said physical attachment point and said base station includes the stored state for associating the wireless terminal identifier corresponding to said wireless terminal with said logical link layer identifier.

28. The base station of claim 27, wherein said storing results in said wireless terminal identifier being associated in said base station with said logical link layer identifier and multiple physical attachment points through which said wireless terminal communicates with a logical link layer identified by said logical link layer identifier.

29. An apparatus for wireless communication, comprising:
a receiver receiving a signal, said signal indicating that a logical link state is present in one or more access nodes corresponding to one or more respective physical attachment points for which a physical layer connection does not already exist, said one or more physical attachment points being identified by one or more respective physical attachment point identifiers; and
a processor executing instructions storing information in memory associating said one or more physical attachment point identifiers with a logical link identifier for identifying a logical link with which a wireless terminal has a logical connection.

30. The apparatus of claim 29, further comprising:
the processor executing instructions determining said one or more physical attachment point identifiers from one or more respective downlink signals received from said one or more access nodes; and
instructions determining from said stored information and said one or more determined physical attachment point identifiers if a physical attachment point corresponding to one of said one or more determined physical attachment point identifiers corresponds to the logical link with which said wireless terminal has the logical connection.

31. The apparatus of claim 29, wherein said receiver receiving said signal indicating that the logical link state is present in said one or more access nodes corresponding to said one or more respective physical attachment points for which the physical layer connection does not already exist comprises the receiver receiving said signal over a communications link corresponding to said logical link with which said wireless terminal has the logical connection.

32. An apparatus for wireless communication, comprising:
a receiver receiving a connection request from a wireless terminal, said connection request requesting establishment of a connection with a physical attachment point of a base station;
a processor executing instructions determining if said received connection request includes a logical link layer identifier corresponding to said physical attachment point of said base station, and if said base station includes a stored state for associating a wireless terminal identifier corresponding to said wireless terminal with said logical link layer identifier; and
instructions establishing a connection between the wireless terminal and the physical attachment point of said base station.

33. The apparatus of claim 32, further comprising:
the processor executing instructions storing information associating said physical attachment point with said wireless terminal and said logical link layer identifier when said instructions determining determines that said received connection request includes the logical link layer identifier corresponding to said physical attachment point of said base station, and that said base station includes the stored state for associating the wireless terminal identifier corresponding to said wireless terminal with said logical link layer identifier.

34. The apparatus of claim 33, wherein said instructions storing information causes said wireless terminal identifier to be associated in said base station with said logical link layer identifier and multiple physical attachment points through which said wireless terminal communicates with a logical link layer identified by said logical link layer identifier.

35. A computer program product, comprising:
a non-transitory computer-readable medium comprising code for:
receiving a signal, said signal indicating that a logical link state is present in one or more access nodes corresponding to one or more respective physical attachment points for which a physical layer connection does not already exist, said one or more physical attachment points being identified by one or more respective physical attachment point identifiers; and
storing information in memory associating said one or more physical attachment point identifiers with a logical link identifier for identifying a logical link with which a wireless terminal has a logical connection.

36. The computer program product of claim 35, wherein the non-transitory computer-readable medium further comprises code for:
determining said one or more physical attachment point identifiers from one or more respective downlink signals received from said one or more access nodes; and
determining from said stored information and said one or more determined physical attachment point identifiers if a physical attachment point corresponding to one of said one or more determined physical attachment point identifiers corresponds to the logical link with which said wireless terminal has the logical connection.

37. The computer program product of claim 35, wherein said code for receiving said signal indicating that the logical link state is present in said one or more access nodes corresponding to said one or more respective physical attachment points for which the physical layer connection does not already exist comprises code for receiving said signal over a communications link corresponding to said logical link with which said wireless terminal has the logical connection.

38. A computer program product, comprising:
a non-transitory computer-readable medium comprising code for:
receiving a connection request from a wireless terminal, said connection request requesting establishment of a connection with a physical attachment point of a base station;
determining if said received connection request includes a logical link layer identifier corresponding to said physical attachment point of said base station, and if said base station includes a stored state for associating a wireless terminal identifier corresponding to said wireless terminal with said logical link layer identifier; and
establishing a connection between the wireless terminal and the physical attachment point of said base station.

39. The computer program product of claim 38, wherein the non-transitory computer-readable medium further comprises code for:
storing information associating said physical attachment point with said wireless terminal and said logical link layer identifier when said code for determining determines that said received connection request includes the logical link layer identifier corresponding to said physical attachment point of said base station, and that said base station includes the stored state for associating the wireless terminal identifier corresponding to said wireless terminal with said logical link layer identifier.

40. The computer program product of claim 39, wherein said code for storing information causes said wireless terminal identifier to be associated in said base station with said logical link layer identifier and multiple physical attachment points through which said wireless terminal communicates with a logical link layer identified by said logical link layer identifier.

* * * * *